United States Patent
Qui et al.

(10) Patent No.: US 10,445,022 B1
(45) Date of Patent: Oct. 15, 2019

(54) OPTIMIZATION OF LOG-STRUCTURED MERGE (LSM) TREE-BASED DATABASES USING OBJECT SOLID STATE DRIVE (SSD) DEVICES

(71) Applicant: Alibaba Group Holding Limited, Grand Cayman (KY)

(72) Inventors: Sheng Qui, Dublin, CA (US); Fei Liu, Burlingame, CA (US); Shu Li, Santa Clara, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/963,386

(22) Filed: Apr. 26, 2018

(51) Int. Cl.
 *G06F 12/00* (2006.01)
 *G06F 3/06* (2006.01)
 *G06F 7/14* (2006.01)
 *G06F 16/25* (2019.01)

(52) U.S. Cl.
 CPC .......... *G06F 3/0661* (2013.01); *G06F 3/0608* (2013.01); *G06F 3/0679* (2013.01); *G06F 7/14* (2013.01); *G06F 16/258* (2019.01)

(58) Field of Classification Search
 None
 See application file for complete search history.

(56) References Cited

U.S. PATENT DOCUMENTS

| | | | |
|---|---|---|---|
| 7,257,690 B1 | 8/2007 | Baird | |
| 8,527,544 B1 | 9/2013 | Colgrove et al. | |
| 8,886,691 B2 | 11/2014 | Colgrove et al. | |
| 9,448,924 B2 | 9/2016 | Sundaram et al. | |
| 9,519,591 B2 | 12/2016 | Lomet et al. | |
| 9,646,067 B2 | 5/2017 | Abercrombie et al. | |
| 9,652,381 B2 | 5/2017 | Higgins et al. | |
| 9,785,366 B1 | 10/2017 | Morley et al. | |
| 9,940,234 B2 | 4/2018 | Davis | |
| 2004/0044873 A1* | 3/2004 | Wong | G06F 12/0246 711/218 |
| 2014/0173226 A1* | 6/2014 | Gold | G06F 3/06 711/159 |
| 2016/0378653 A1 | 12/2016 | Lu et al. | |
| 2017/0075781 A1* | 3/2017 | Bennett, Jr. | G06F 3/0619 |
| 2017/0199818 A1 | 7/2017 | Lomet et al. | |
| 2017/0329705 A1 | 11/2017 | Gupta et al. | |
| 2017/0364414 A1 | 12/2017 | Pogosyan et al. | |
| 2018/0089244 A1* | 3/2018 | Velayudhan Pillai | G06F 16/221 |

(Continued)

*Primary Examiner* — John A Lane
(74) *Attorney, Agent, or Firm* — James J. DeCarlo; Greenberg Traurig, LLP (57) ABSTRACT

The disclosed embodiments are directed to improvements in log-structured merge (LSM) tree databases. In one embodiment, a method is disclosed comprising receiving data to be written to a log-structured merge (LSM) tree, the data including a key and value; determining that an in-memory buffer lacks capacity to store the data to be written; compacting key-ranges stored in at least one level of the LSM tree stored in an object storage device (OSD), each of the key-ranges associated with a respective object identifier; generating a key range object, the key range object including object identifiers associated with a subset of the key-ranges; erasing physical blocks corresponding to each of the object identifiers included in the key range object; and writing the key range object to at least one physical block of the OSD.

20 Claims, 8 Drawing Sheets

(56) References Cited

U.S. PATENT DOCUMENTS

| | | |
|---|---|---|
| 2018/0107402 A1 | 4/2018 | Pogosyan et al. |
| 2018/0225322 A1* | 8/2018 | Boles ................ G06F 16/9027 |
| 2019/0012329 A1* | 1/2019 | Schreter ............. G06F 16/951 |
| 2019/0043540 A1* | 2/2019 | Chagam Reddy ....... G11C 7/10 |
| 2019/0129818 A1* | 5/2019 | Kannan ............... G11C 29/022 |

* cited by examiner

OPTIMIZATION OF LOG-STRUCTURED MERGE (LSM) TREE-BASED DATABASES USING OBJECT SOLID STATE DRIVE (SSD) DEVICES

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments relate to database optimization and, in particular, to methods, systems, and apparatuses for optimizing log-structure merge (LSM) tree-based databases using object solid state drive (SSD) devices.

An LSM tree is a data storage architecture where data is stored as key-value pairs across multiple storage structures. Using a two-level LSM tree as an example, a first tree structure ($C_0$) stores key-value ranges in, for example, local memory while a second tree structure ($C_1$) is stored on a persistent storage device. New records are only inserted into $C_0$, which is fixed in size. If the insertion of a new record would cause $C_0$ to exceed the fixed size of the structure, a continuous range of key-value pairs is remove from $C_0$ and inserted into $C_1$. The movement of data from a lower level (e.g., $C_0$) to a higher level (e.g., $C_1$) is referred to as compaction.

LSM trees are well-suited for key-value databases such as ROCKSDB (created by Facebook, Inc. of Menlo Park, Calif.) or LEVELDB (created by Google, Inc. of Mountain View, Calif.). Since these databases use keys as the fundamental write/retrieval index, the logical data model of the database interface maps explicitly to the LSM tree structure. For this reason, LSM trees are commonly used in such key-value databases to improve compression rates, less input/output (I/O) capacity required for persisting changes, and a simpler code base.

Despite these improvements, compaction operations of the LSM tree result in inefficiencies when used with storage devices. Specifically, the compaction operations are computationally expensive due to the number of reads required for several key-value ranges to enable sorted insertion. This computation is compounded by the underlying physical storage mechanism which also performs its own routine maintenance. For example, solid-state Flash drives employ in asynchronous garbage collection routine that ensures that invalid pages are removed from the underlying Flash blocks. During compaction, since key ranges may not all be stored on a single block (or series of blocks), the erasure of a key range usually results in invalid pages being left on the underlying SSD. Thus, the compaction process additionally includes the overhead of the underlying SSD garbage collection process, which increases latency when accessing the SSD (due to the garbage collection process temporarily halting reads and writes).

BRIEF SUMMARY

The disclosed embodiments solve these and other problems by introducing a new type of storage device, namely, an object-storage device (OSD). The OSD is configured to read, write, and delete at the block-level of the underlying storage medium (e.g., NAND Flash). By operating at the block-level, the OSD can erase objects by invaliding entire blocks of data versus page-level invalidation. As a result, the garbage collection procedure employed by the OSD is not required to copy valid pages from blocks including invalid pages (as performed in current systems). Thus, the garbage collection overhead of the storage device is significantly reduced.

In one embodiment, a method is disclosed comprising receiving data to be written to a log-structured merge (LSM) tree, the data including a key and value; determining that an in-memory buffer lacks capacity to store the data to be written; compacting key-ranges stored in at least one level of the LSM tree stored in an object storage device (OSD), each of the key-ranges associated with a respective object identifier; generating a key range object, the key range object including object identifiers associated with a subset of the key-ranges; erasing physical blocks corresponding to each of the object identifiers included in the key range object; and writing the key range object to at least one physical block of the OSD.

In another embodiment, a method is disclosed comprising receiving, at an object storage device (OSD), a write request, the write request including a plurality of object identifiers comprising at least one new object identifier and at least one existing object identifier; erasing, by the OSD, blocks of data associated with the existing object identifier; and writing, by the OSD, data associated with the existing object identifier and data associated with the new object identifier.

In another embodiment, an apparatus is disclosed comprising a storage medium, the storage medium storing data in a plurality of blocks, each block having a plurality of pages; an object interface configured to receive commands from an object device driver; and a controller communicatively coupled to the storage medium and the object interface and configured to receive commands via the object interface, the controller further including stored program comprising: logic, executed by the controller, for receiving a write request, the write request including a plurality of object identifiers comprising at least one new object identifier and at least one existing object identifier, logic, executed by the controller, for erasing blocks of data associated with the existing object identifier, and logic, executed by the controller, for writing data associated with the existing object identifier and data associated with the new object identifier.

The figures and description below further illustrate the aforementioned advantages and embodiments of the disclosure.

BRIEF DESCRIPTION OF THE DRAWINGS

The preceding and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Figure 1:
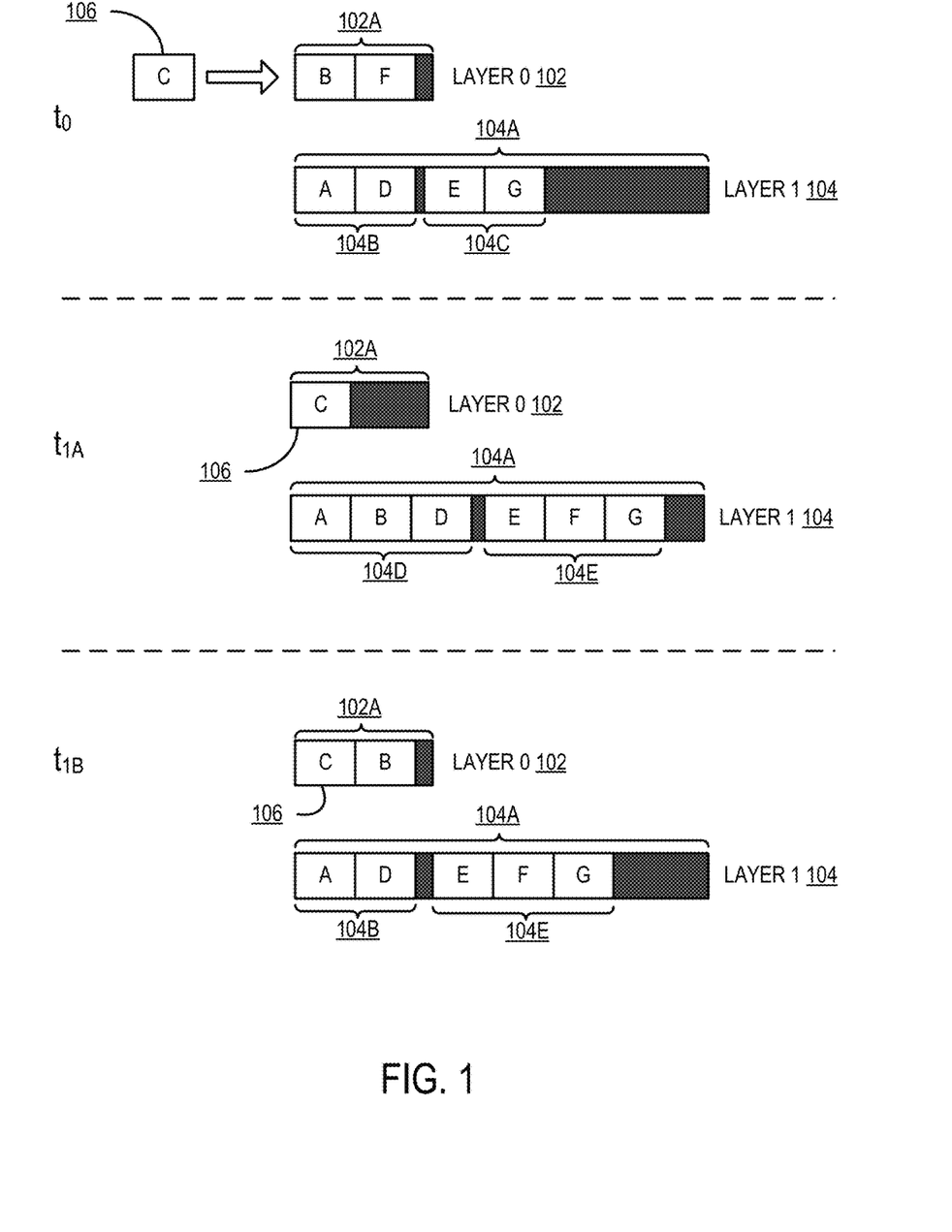
FIG. 1 illustrates the operation of a two-level LSM tree.

FIG. 1 illustrates the operation of a two-level LSM tree.

The tree includes two levels (102, 104). In one embodiment, level 0 (102) may be stored in local memory (e.g., random-access memory (RAM)). Level 1 (104) may be stored on a solid state device (SSD). Each level (102, 104) has a corresponding capacity (102A, 104). Each item of data (A through G) has a fixed size. In the illustrated embodiment, items A through G are assigned to a sortable key (illustrated alphabetically although numerical keys may also be used).

As illustrated, prior to the insertion of item C, the keys are sorted within each layer. Thus, in layer 0 (102) the keys are sorted (B, F) and in layer 1, each range (104B, 104C) is sorted (as A and D and E and G, respectively). As illustrated, at time t0, item C (106) is inserted into layer 0 (102).

However, the capacity (102A) of layer 0 (102) is not large enough to accommodate item C (106), thus compaction is required.

Two embodiments of the compaction processes are illustrated in times $t_{1A}$ and $t_{1B}$, respectively. In a first embodiment ($t_{1A}$), the contents of layer 0 (102) are flushed and inserted into layer 1 (104). In this embodiment, each item (A, B) previously in layer 0 (102) is inserted into sorted ranges (104D, 104E). Thus, the size of key ranges (104B, 104C) are increased to ranges (104D, 104E) to accommodate items B and F. Item C (106) is inserted into layer 0 (102).

In a second embodiment, only a minimal number of items may be compacted from layer 0 (102) to support the insertion of item C (106). In this embodiment, one of items B and F may be compacted to layer 1 (104). In the illustrated embodiment, item F is selected and compacted to range (102E). Item C (106) is then inserted into layer 0 (102). As illustrated, the items in layer 0 (102) may not be required to be ordered, to support a stack-like popping of items when the capacity (102A) is reached. Additionally, although illustrated as non-overlapping, layer 1 (104) may include overlapping key ranges. Conversely, layers beyond layer 1 (104), which are not illustrated, may require non-overlapping key ranges.

Figure 2A:
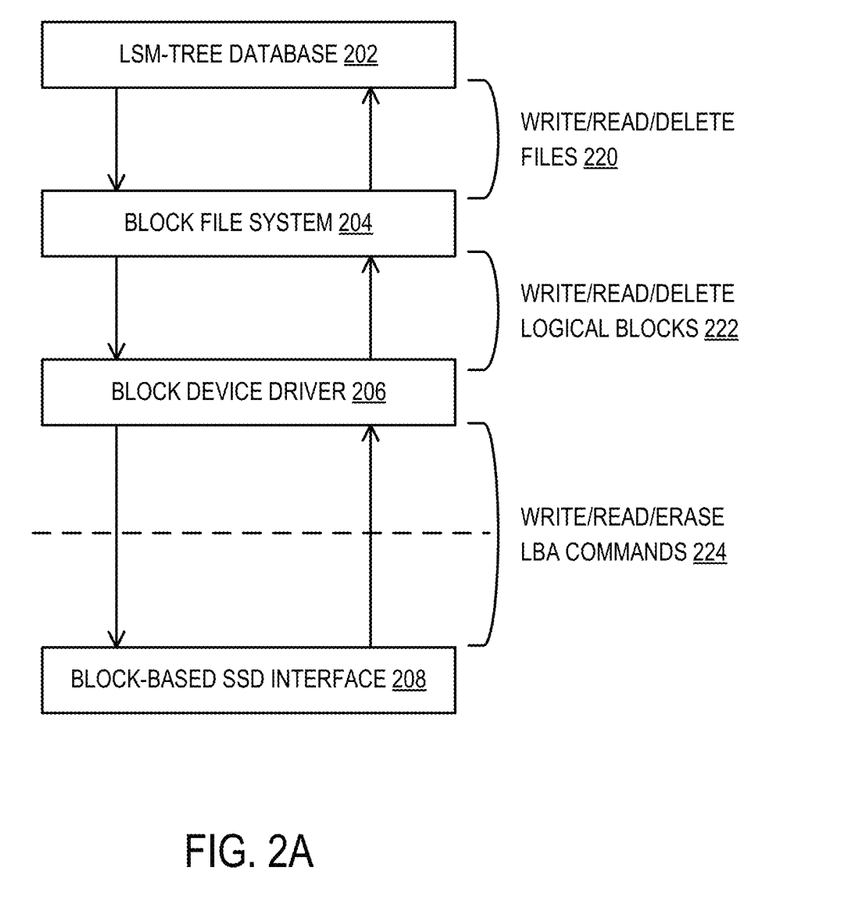
FIG. 2A illustrates a block diagram of file operations in a block-based storage device according to some embodiments of the disclosure.

FIG. 2A illustrates a block diagram of file operations in a block-based storage device.

An LSM-tree database (202) is configured to handle read and write requests for key-value pairs from third-party applications (not illustrated). To handle these key-value pairs, the database (202) issues write, read, and delete file commands (220) to the underlying block-based filed system (204). In general, commands (220) may comprise any supported filesystem commands (e.g., system calls). At the file system (204) level, high-level read/write/delete commands (220) are translated into write/read/erase commands (222) which utilize the logical blocks of the data to be written to an SSD. These block-based commands (222) are transmitted to the block device driver (206). In one embodiment, the driver (206) comprises a block-based device driver installed within the operating system. The driver (206) converts the block-based representation of the read/write/erase commands (222) into commands utilizing the logical block address (LBA) identifiers associated with the underlying data. These LBA-based commands (224) are then transmitted to the SSD interface (208) for processing. As illustrated, the SSD interface (208) is resident on an SSD or similar storage device (e.g., a NAND Flash device). The interface (208) converts the LBAs in the commands (224) to physical block address (PBA) locations. In general, an LBA-to-PBA mapping is stored in dynamic random access memory (DRAM) installed in the SSD.

The SSD interface (208) returns the results of the PBA processing to the block device driver (206). The driver (206) converts the LBA to a block address and returns the data to the file system (204) which in turn responds to the system call issued by database (202).

Figure 2B:
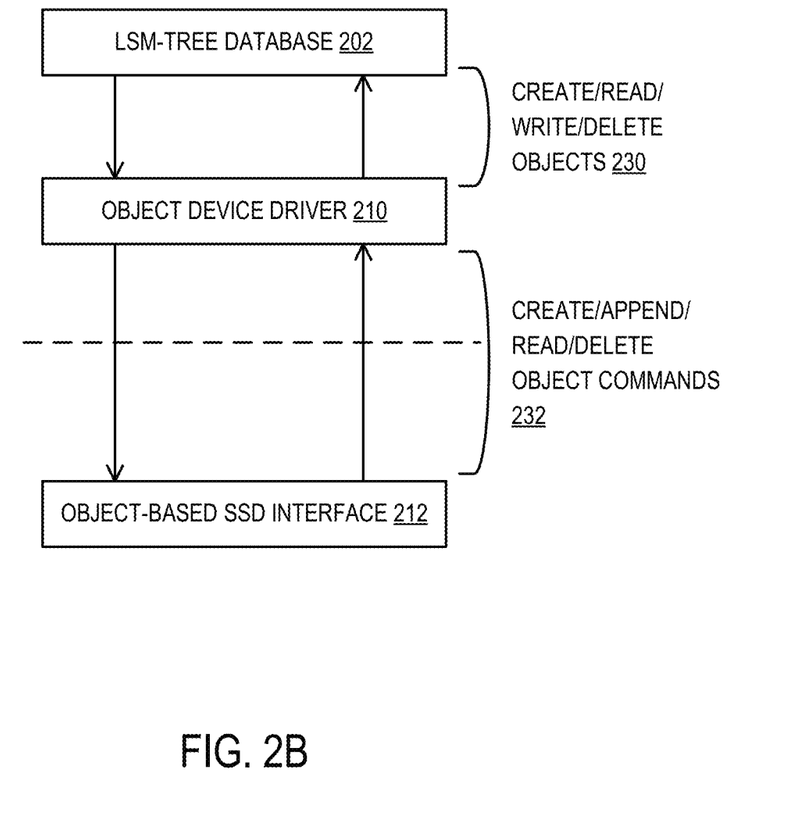
FIG. 2B illustrates a block diagram of file operations in an object-based storage device according to some embodiments of the disclosure.

FIG. 2B illustrates a block diagram of file operations in an object-based storage device.

In the illustrated embodiment, database (202) comprises the same external-facing interface as that in FIG. 2A. That is, third-party applications issue reads, writes, deletes, etc. in the same manner as with a traditional block-based system. In FIG. 2B, however, the block file system (204) and block device driver (206) are omitted, and file operations are executed directly using an object device driver (210). In this manner, the improved object-based system in FIG. 2B may fully replace the block-based system in FIG. 2A without any changes to the applications accessing the database (202).

In FIG. 2B, however, the translation of file operations is from database-specific commands to create/read/write/delete object commands (230). These commands operate on an object-level and not a block-level as in FIG. 2A.

Commands (230) are transmitted to the object device driver (210) which translates the database object commands into SSD object commands (232). In one embodiment, these commands may be substantially similar as they both operate on an object-level. The driver (210) issues the SSD commands (232) to the SSD interface (212) which performs object-level operations on the underlying SSD device.

Figure 3:
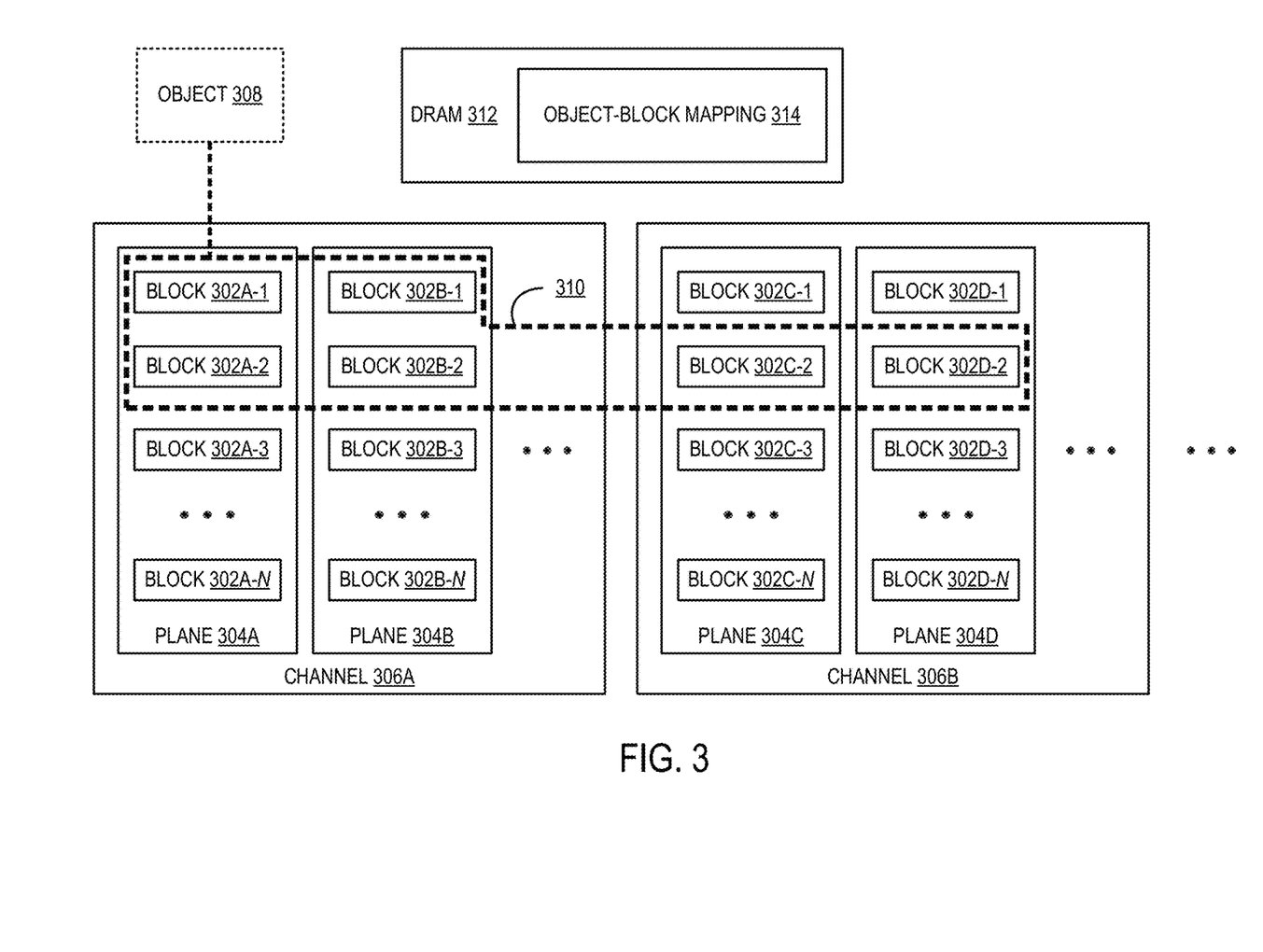
FIG. 3 is a block diagram illustrating the architecture of an object storage device (OSD) according to some embodiments of the disclosure.

FIG. 3 is a block diagram illustrating the architecture of an object storage device (OSD) according to some embodiments of the disclosure.

In the illustrated device, data is stored on one or more channels or dies (306A, 306B). Although two channels are illustrated, more or fewer may be implemented in practice. Each channel includes a set of planes (e.g., 304A, 304B) and each plane (e.g., 304A) includes a plurality of blocks (e.g., 302A-1, 302A-2, 302A-3 . . . 302A-N). Although not illustrated, each block includes a set of pages which represent the smallest unit of readable and writeable data in the device. In contrast, a block is the smallest unit of erasable data in the device.

In traditional SSDs, an object (308) that is written to the device may be split up (using filesystem blocks) and stored on various pages throughout the storage space. In practice, these filesystem blocks are interleaved on pages with other non-related objects. Thus, a single block (e.g., 302A-1) may include data for multiple objects. When traditional systems erase or update an object from or on the device, they cannot simply erase the blocks associated with the erased object. Rather, the device marks the pages containing the object data as invalid (e.g., in the out-of-band region of the page). At a later time, the device executes a garbage collection (GC) routine that identifies invalid pages and moves the other pages on the block containing the invalid page to a new block. The GC process then erases the block, ensuring that non-erased data is not inadvertently erased. Finally, the LBA-to-PBA address is updated after the GC process completes.

In contrast to this operation, the illustrated device stores object data on contiguous blocks. For example, object (308) is partitioned and stored across blocks in a contiguous group (310) (i.e., blocks 302A-1, 302A-2, 302B-2, 302C-2, and 302D-2). The specific arrangement and number of blocks is not limited. In this manner, each block is associated with a unique object. Thus, if an application modifies or erases a block, the GC collection process is not required. That is, since each block corresponds to a single object, the block may be immediately erased or modified since there is no risk of data loss of unrelated blocks.

As illustrated, the device additionally includes an object-to-block mapping (314) stored within DRAM (312). In traditional systems, DRAM (312) would instead include an LBA-to-PBA mapping. Instead, the illustrated device replaces (or supplements) an LBA-to-PBA mapping with the object-to-block mapping (314) which serves to translate object identifiers to physical block addresses during read, write, erase, and other operations. In one embodiment, the mapping (314) stores a mapping of each physical block and object identifier (including unused physical block addresses). In alternative embodiments, the mapping (314) may only include mappings of used PBAs to objects. In this embodiment, an OOB region of the block may store a pointer to the next contiguous block.

As an example, the pages illustrated in FIG. 3 may be sized at approximately 2 KB (with additional OOB storage space per-page). A given block may include 64 pages, for a total size of approximately 131 KB. Object (308) may comprise a 780 KB object. In this example, the system determines that six blocks (totaling 786 KB in usable storage space) are required to accommodate the object. Alternatively, in the worst case scenario, a traditional system may segment the object (308) into 390 different blocks (e.g., out of 2048 total blocks), with a single page on each block storing a 2 KB portion of the object.

Figure 4A:
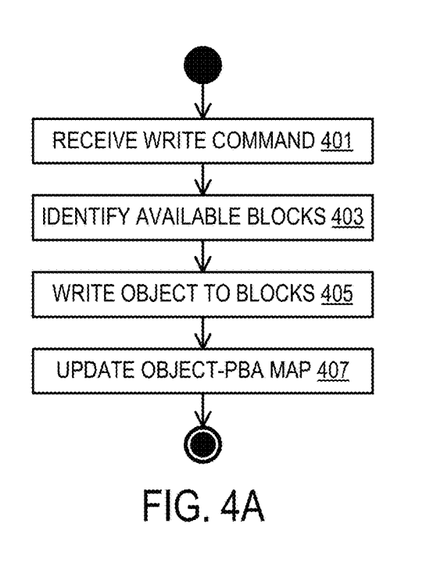
FIG. 4A illustrates a write operation in an OSD according to some embodiments of the disclosure.

FIG. 4A illustrates a write operation in an OSD according to some embodiments of the disclosure. In one embodiment, the method in FIG. 4A is performed by a controller of an OSD. In one embodiment, the controller of the OSD includes an application specific integrated circuit (ASIC) or other type of processing element.

In step 401, the method receives a write command.

In one embodiment, the write command includes data to be written as well as an object identifier. The specific form of the object identifier and the specific contents are not intended to be limiting. In general, an object identifier may comprise any unique identifier (e.g., a unique alphanumeric code).

In step 403, the method identifies available blocks.

In one embodiment, the method may analyze the blocks of an SSD for each command. However, to improve performance, the method may use a mapping of all blocks stored in DRAM. In this embodiment, the method identifies in memory which blocks are currently unassigned. In one embodiment, the method iterates sequentially through the blocks to locate an available range of blocks. In one embodiment, the method determines the number of blocks needed based on the block size and the size of the data to be written.

In step 405, the method writes the data to be written to the blocks identified in step 407. In alternative embodiments, the method may monitor the write process to determine if any write fail. If a write fails, the method may either attempt the write to the error-generating block again. Alternatively, the method may select a new, free block and attempt to write the data to the new, free block.

In step 407, the method updates the object-to-PBA mapping.

After completing a write, the method accesses the mapping in DRAM and records the object identifier with the new block addresses for later retrieval (discussed infra).

In one embodiment, the method illustrated in FIG. 4A may additionally be used to handle append commands. In one embodiment, an append command includes an object identifier and data to be written. Since data for a given object is stored on a block-basis, the method writes the new data to additional blocks and updates the object-to-PBA mapping. Thus, there is no need to re-arrange data during an append operation since each block is uniquely associated with an object.

Additionally, in another embodiment, the method illustrated in FIG. 4A may be used to handle update operations. In this embodiment, the method uses the PBA to identify a single block (or group of blocks) associated with the data to be updated in step 403. In one embodiment, the object-to-PBA mapping stores an ordered listing of mappings. Thus, segments 1, 2, and 3 may be mapped to blocks 4, 5, and 6. If an update affects segment 2, the method identified block 5 based on the sequential order of the blocks in the mapping. In this example, the method first erases block 5 and then writes the updated data in step 405. In an alternative embodiment, the method may read all blocks of the updated object into memory and erase all blocks associated with the object. The method may then reconstruct the object in memory and update the re-constructed object using the new data received in step 401. After reconstruction, the method may then proceed with steps 403 through 407 as if a new write command was received.

Figure 4B:
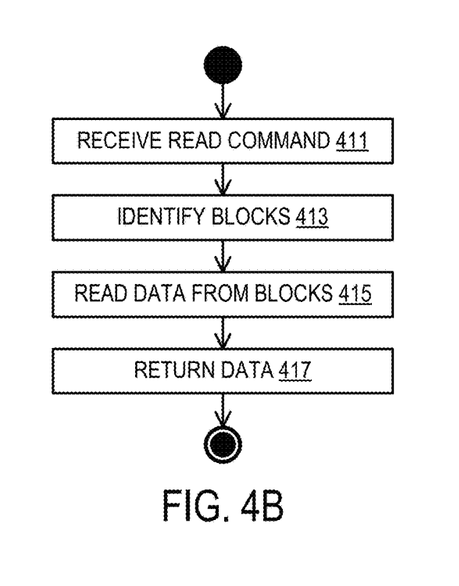
FIG. 4B illustrates a read operation in an OSD according to some embodiments of the disclosure.

FIG. 4B illustrates a read operation in an OSD according to some embodiments of the disclosure. In one embodiment, the method in FIG. 4B is performed by a controller of an OSD.

In step 411, the method receives a read command.

In one embodiment, the read command includes an object identifier. In general, an object identifier may comprise any unique identifier (e.g., a unique alphanumeric code). The read command may be received via an object device driver which generates read commands based on host application reads.

In step 413, the method identifies blocks associated with the object identifier. As discussed above, the method accesses an object-to-PBA mapping to identify one or more blocks associated with the object identifier.

In step 415, the method reads data from each of the blocks.

In step 417, the method returns the data read from each of the blocks.

In one embodiment, the method may further rearrange the data read from each of the blocks (based on the object-to-PBA mapping) to reconstruct the data if the blocks are read out of order.

Figure 4C:
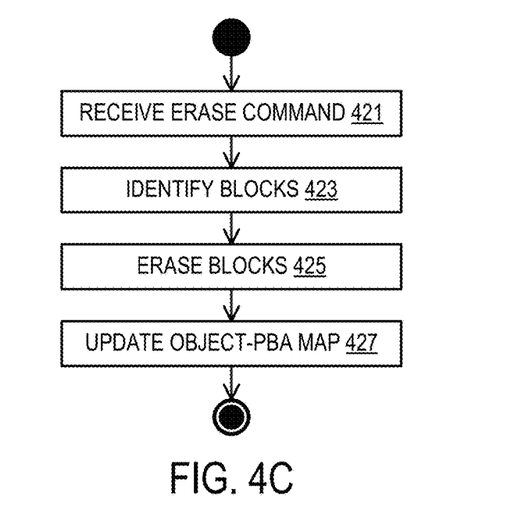
FIG. 4C illustrates an erase operation in an OSD according to some embodiments of the disclosure.

FIG. 4C illustrates an erase operation in an OSD according to some embodiments of the disclosure. In one embodiment, the method in FIG. 4C is performed by a controller of an OSD.

In step 421, the method receives an erase command.

In one embodiment, the erase command includes an object identifier. In general, an object identifier may comprise any unique identifier (e.g., a unique alphanumeric code). The erase command may be received via an object device driver which generates erase commands based on host application erases (e.g., erases triggered via compaction).

In step 423, the method identifies blocks associated with the object identifier received in step 421. This step may be performed as described in connection with step 413 of FIG. 4B, the disclosure of which is incorporated herein by reference in its entirety.

In step 425, the method erases the blocks identified in step 423. In contrast to existing storage devices, the method in step 425 erases entire blocks since each block is guaranteed only to include data for a given object.

In step 427, the method updates the object-to-PBA mapping.

As described above, the object-to-PBA mapping is stored in DRAM and, in step 427, the method may remove all mappings between the object identifier received in step 421 and any blocks, thus freeing those blocks for future writes/modifies/appends.

Figure 5:
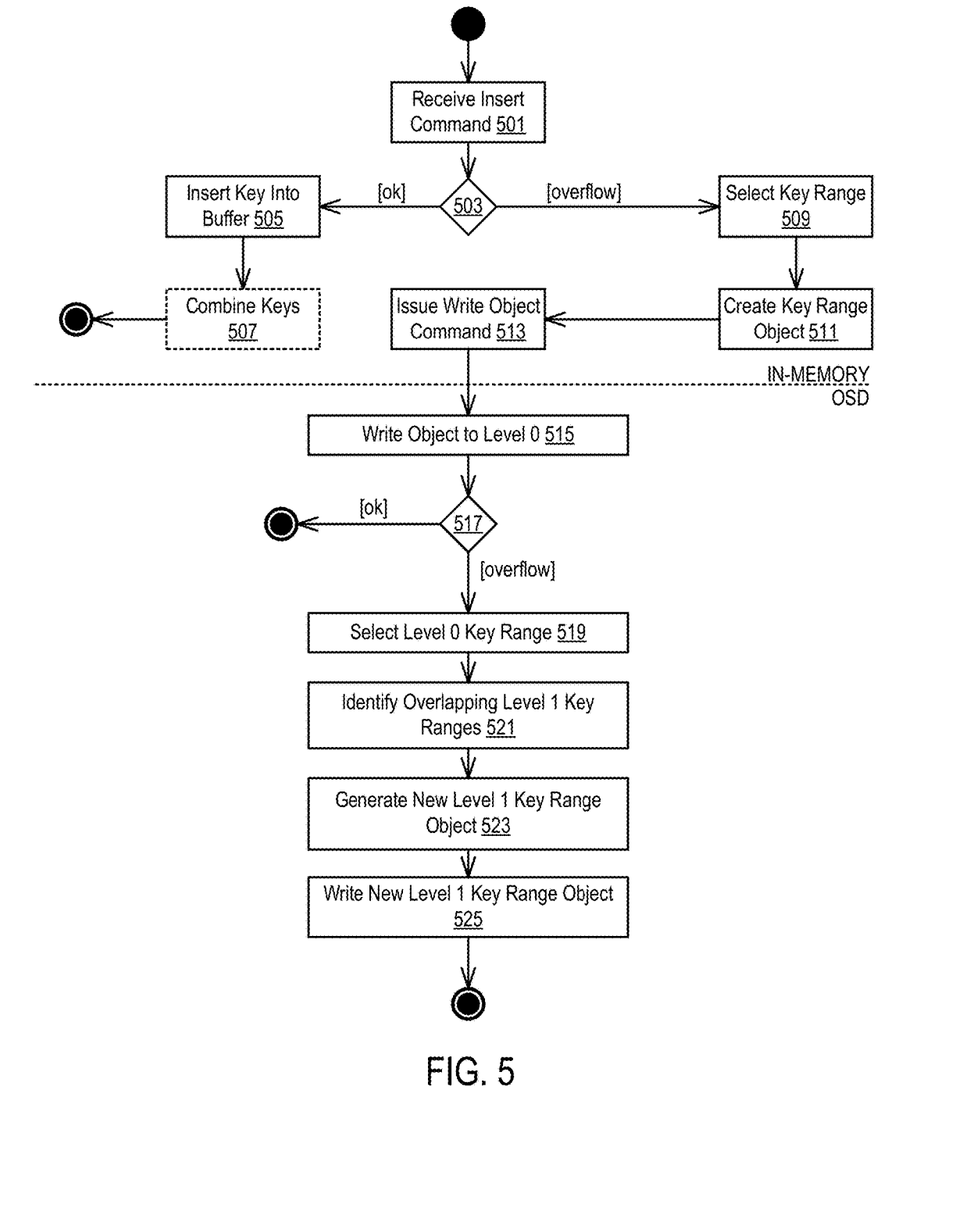
FIG. 5 is a flow diagram illustrating a method for performing single-stage compaction of an LSM-tree database according to some embodiments of the disclosure.

FIG. 5 is a flow diagram illustrating a method for performing single-stage compaction of an LSM-tree database according to some embodiments of the disclosure.

In step 501, the method receives an insert command.

In one embodiment, the insert command includes a key and a value. In one embodiment, the key may comprise an alphanumeric key or similar value. As illustrated, steps 501 (and steps 503-513) are executed in the context of local memory (e.g., RAM).

In step 503, the method determines if insertion of the key/value would result in a memory overflow.

In one embodiment, steps 503-513 all occur in-memory. In one embodiment, the method designates a portion of local memory (e.g., RAM) for storage of a first tier of key-value pairs and key ranges. In one embodiment, this local memory partition is of a fixed size. This partition is referred to as a memory buffer.

In step 503, the method calculates the free space left in the memory buffer. If the memory buffer includes sufficient free space to store the key/value received in step 501, the method writes the key/value to the memory buffer, in step 505. In an optional step 507, the method may also combine overlapping key ranges after inserting the key. For example, if the memory buffer includes key ranges 1-3,5-7 and 10-15 and the insert command includes key 4, the method may combine the key ranges 1-3 and 5-7 to a single range 1-7. In some embodiments, the insertion of the key into the memory buffer is done in a manner that maintains the ordering of keys. In alternative embodiments, the method inserts the keys in a stack mode, which does not maintain a key ordering.

If the method can insert the key/value into the memory buffer without overflowing the buffer, the method ends after step 507.

Alternatively, the method may determine that insertion of the key/value would cause the memory buffer to overflow (step 503). In this scenario, the method must move a portion of the memory buffer to persistent storage.

Upon detecting a potential overflow, the method selects a key range in step 509. In one embodiment, a key range refers to one or more keys that are sequentially ordered with no missing keys. Thus, keys 1-3 or 123-200 form a range of keys.

In step 511, the method creates a key-range object.

In one embodiment, a key-range object comprises a set of sequential key-range pairs ordered by key. The object itself is identified by a single object identifier which may comprise an alphanumeric identifier. In one embodiment, a key range is represented by a single file, and the object identifier may comprise the filename of the key range object.

In step 513, the method issues a write command with the key range object.

In one embodiment, the write command comprises any suitable command for writing data to a storage device. In the illustrated embodiment, the write command corresponds to a write object command supported by a driver of the object storage device, as discussed supra. The write command generally includes the object identifier and the contents of the key range object.

In the illustrated embodiment, steps 501-513 are performed using an in-memory buffer. Thus, each of the operations may be performed using memory mapped read/write/erase commands. However, steps 515 through 527 are executed using an application programming interface (API) of an object storage device.

In step 515, the method writes the object to level 0 of the LSM tree.

In the illustrated embodiment, the object corresponds to the key-range associated with an object identifier. In one embodiment, writing an object to level 0 includes two processes. First, the LSM-database implementing the method must process the write logically using the levels organized by the LSM database. Additionally, the controller of the OSD must also issue writes to ensure that the object is actually written to the underlying storage medium.

In step 517, the method determines whether writing to level 0 would result in overflow at that level.

Similar to step 503, level 0 on the OSD may logically be assigned a predefined storage capacity. In step 503, the method calculates the remaining free space within level 0 and determine if enough free space exists to accommodate the writing of the object created in step 511.

If there is enough space available in level 0, the method writes the object and ends. Although writing (step 515) is illustrated as occurring before analyzing free space (step 517), the order of these steps may be reversed (as illustrated in steps 503, 505, and 509).

If the method determines that writing the object to level 0 would cause an overflow in that level, the method proceeds to initiate a second compaction procedure.

In step 519, the method selects a level 0 key range.

In the illustrated embodiment, selecting a level 0 key range may comprise similar operations as described in step 511. Specifically, the method selects one or more key-ranges stored in level 0. In one embodiment, the method selects the number of key ranges based on the storage space needed to write the object from step 515. In some embodiments, the selected ranges may be arbitrarily chosen. In other embodiments, the method may record the frequency of access and select less frequently accessed key ranges. Alternatively, the method may treat level 0 as a stack or queue and programmatically select items at the top or end of the structure, respectively.

In step 521, the method identifies overlapping key ranges in level 1.

As described previously, each level may include duplicated keys in various ranges. As one example, level 0 may include a key range 100-200 and level 1 may include key ranges 130-180 and 190-240. In step 521, the method determines the extent of overlap between the selected object in level 0 and the objects in level 1. Thus, in the previous example, range 100-200 includes range 130-180 and partially includes range 190-240. Additionally, the selected object "bridges" the gap between the end of range 130-180 and 190-240 (namely, range 181-189). Thus, during compaction, ranges 130-180 and 190-240 are combined with range 100-200 to form a new level 1 key range.

In step 523, the method generates a new level 1 key range object based on the identified ranges.

In one embodiment, the new level 1 key range object comprises a file represented by an object identifier. The content of the file comprises the key/value pairs in the identified level 0 and level 1 ranges. In one embodiment, the generation of the new level 1 key range object may be performed by the LSM-database.

Figure 6:
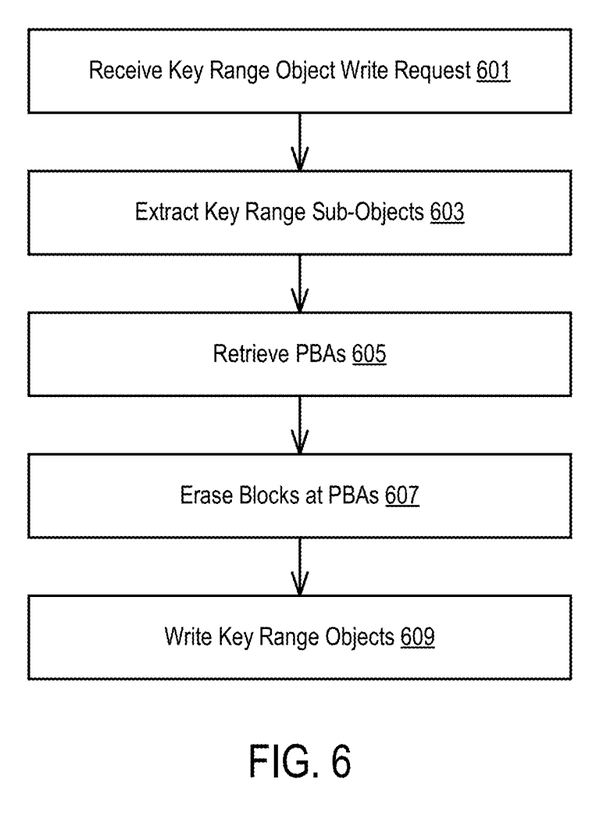
FIG. 6 is a flow diagram illustrating a method for writing a key range object to an object storage device according to some embodiments of the disclosure.

In step 525, the method writes the new level 1 key range object. Reference is made to FIG. 4B for the internal operations performed by the OSD device. Detailed operations of step 525 are described in FIG. 6A.

FIG. 6 is a flow diagram illustrating a method for writing a key range object to an object storage device according to some embodiments of the disclosure.

In step 601, the method receives the key range object write request. In one embodiment, the LSM-tree database initiates step 525 (and thus step 601) by issuing a system call to the write command provided by the OSD driver.

In step 603, the method extracts key range sub-objects.

In one embodiment, a key range sub-object refers to the levels 0 and 1 (and potentially additional level) key ranges to be compacted. In one embodiment, this sub-object includes the object identifiers of the objects to be compacted.

In step 605, the method identifies the PBAs for each object identifier.

As discussed previously, a mapping in DRAM maps object identifiers to physical block addresses associated with the object identifies. Thus, in step 605, the method uses the sub-object identifiers to generate a listing of physical block addresses.

In step 607, the method issues erase commands to each block included in the PBA list.

As illustrated, the method does not perform any copying of data in the physical blocks since each physical block is uniquely assigned to a key-range at a given level. Thus, in step 607, the method issues a single erase request for each PBA. In one embodiment, the erase request marks the entire block as invalid.

In step 609, the method then writes the data received in step 601 to storage.

Thus, after the execution of steps 601-609, the method invalidates all previous compacted key range objects and writes a new key range object. This procedure does not perform any copying of page-level data to new blocks but rather invalidates entire blocks. Thus, during any subsequent garbage collection processes, no copying is required as the entire block has been marked as invalid. This removal of copying enhances the speed in which the OSD can garbage collect invalid pages due to the removal of copying.

Returning to FIG. 5, in some embodiments, the method may not write the level 0 object in step 515, but rather may defer writing until steps 517-525 are executed. In this embodiment, after executing step 525, the method may write the level 0 object to level 0 storage after storage space is freed using steps 519-525. In one embodiment, the writing of the level 0 object is performed using the method described in FIG. 4A, the disclosure of which is incorporated by reference in its entirety.

Figure 7:
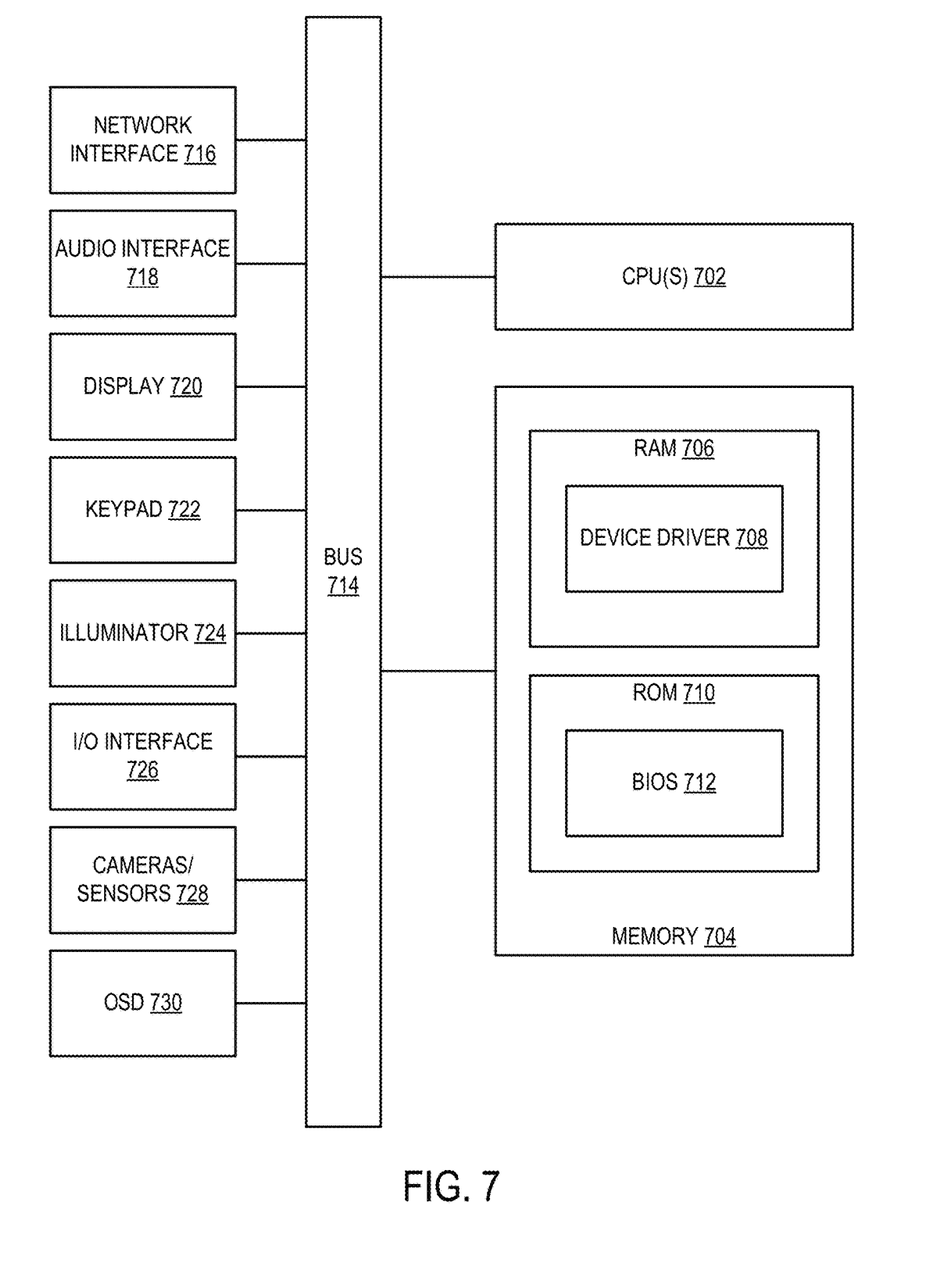
FIG. 7 is a hardware diagram illustrating a device for accessing an object storage device according to some embodiments of the disclosure.

FIG. 7 is a hardware diagram illustrating a device for accessing an object storage device according to some embodiments of the disclosure.

Client device may include many more or fewer components than those shown in FIG. 7. However, the components shown are sufficient to disclose an illustrative embodiment for implementing the present disclosure.

As shown in FIG. 7, client device includes processing units (CPUs) (702) in communication with a mass memory (704) via a bus (714). Client device also includes one or more network interfaces (716), an audio interface (718), a display (720), a keypad (722), an illuminator (724), an input/output interface (726), and a camera(s) or other optical, thermal or electromagnetic sensors (728). Client device can include one camera/sensor (728), or a plurality of cameras/sensors (728), as understood by those of skill in the art.

Client device may optionally communicate with a base station (not shown), or directly with another computing device. Network interface (716) includes circuitry for coupling client device to one or more networks and is constructed for use with one or more communication protocols and technologies. Network interface (716) is sometimes known as a transceiver, transceiving device, or network interface card (NIC).

Audio interface (718) is arranged to produce and receive audio signals such as the sound of a human voice. For example, audio interface (718) may be coupled to a speaker and microphone (not shown) to enable telecommunication with others and generate an audio acknowledgment for some action. Display (720) may be a liquid crystal display (LCD), gas plasma, light emitting diode (LED), or any other type of display used with a computing device. Display (720) may also include a touch sensitive screen arranged to receive input from an object such as a stylus or a digit from a human hand.

Keypad (722) may comprise any input device arranged to receive input from a user. For example, keypad (722) may include a push button numeric dial, or a keyboard. Keypad (722) may also include command buttons that are associated with selecting and sending images. Illuminator (724) may provide a status indication and provide light. Illuminator (724) may remain active for specific periods of time or in response to events. For example, when illuminator (724) is active, it may backlight the buttons on keypad (722) and stay on while the client device is powered. Also, illuminator (724) may backlight these buttons in various patterns when particular actions are performed, such as dialing another client device. Illuminator (724) may also cause light sources positioned within a transparent or translucent case of the client device to illuminate in response to actions.

Client device also comprises input/output interface (726) for communicating with external devices, such as UPS or switchboard devices, or other input or devices not shown in FIG. 7. Input/output interface (726) can utilize one or more communication technologies, such as USB, infrared, Bluetooth™, or the like.

Mass memory (704) includes a RAM (706), a ROM (710), and other storage means. Mass memory (704) illustrates another example of computer storage media for storage of information such as computer-readable instructions, data structures, program modules or other data. Mass memory (704) stores a basic input/output system ("BIOS") (712) for controlling low-level operation of client device. The mass memory may also store an operating system for controlling the operation of client device. It will be appreciated that this component may include a general-purpose operating system such as a version of UNIX, or LINUX™, or a specialized client communication operating system such as Windows Client™, or the Symbian® operating system. The operating system may include, or interface with a Java virtual machine module that enables control of hardware components and operating system operations via Java application programs.

Memory (704) further includes an OSD device driver (708). As discussed above, OSD device driver (708) issues read, write, and other commands to storage devices (not illustrated). In one embodiment, the OSD device driver (708) issues such commands to OSD (730). In one embodiment, OSD (730) may comprise a solid-state drive or similar device that implements one or more NAND Flash chips such as the chips described in the description of FIG. 3 which is incorporated by reference. In general, OSD (730) comprises any NAND Flash-based device that implements object-based access such as that illustrated in FIG. 3 and other figures.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    receiving, by a processor, data to be written to a log-structured merge (LSM) tree, the data including a key and value;
    determining, by the processor, that an in-memory buffer lacks capacity to store the data to be written;
    compacting, by the processor, key-ranges stored in at least one level of the LSM tree stored in an object storage device (OSD), each of the key-ranges associated with a respective object identifier;
    generating, by the processor, a key range object, the key range object including object identifiers associated with a subset of the compacted key-ranges;
    erasing, by the OSD, physical blocks corresponding to each of the object identifiers included in the generated key range object; and
    writing, by the OSD, the generated key range object to at least one physical block of the OSD.

2. A method comprising:
    receiving, at an object storage device (OSD), a write request, the write request including a plurality of object identifiers comprising at least one new object identifier and at least one existing object identifier;
    erasing, by the OSD, blocks of data associated with the existing object identifier; and
    writing, by the OSD, data associated with the existing object identifier and data associated with the new object identifier.

3. The method of claim 2, the erasing blocks of data associated with the existing object identifier comprising invalidating all pages in the blocks of data.

4. The method of claim 3, further comprising triggering, by the OSD, a garbage collection routine, the garbage collection routine bypassing copying of data on the erased blocks of data.

5. The method of claim 2, the receiving a write request comprising receiving a write request generated by a log-structured merge tree database compaction operation.

6. The method of claim 2, further comprising storing, by the OSD, an object-to-PBA (physical block address) mapping.

7. The method of claim 6, further comprising, prior to erasing blocks of data associated with the existing object identifier, identifying, by the OSD, a plurality of blocks in the object-to-PBA mapping using the at least one existing object identifier.

8. The method of claim 6, the writing data associated with the existing object identifier and data associated with the new object identifier further comprising updating the object-to-PBA mapping after writing the data.

9. The method of claim 2, the receiving a write request comprising receiving a key range object, the key range object including a plurality of keys and a plurality of values associated with the plurality of keys.

10. The method of claim 2, the receiving a write request comprising receiving a write request via an object device driver.

11. The method of claim 2, the writing data associated with the existing object identifier and data associated with the new object identifier comprising segmenting the data based on a block size of the OSD and writing the segmented data to a plurality of blocks, the plurality of blocks only storing data written in response to the write request.

12. An apparatus comprising:
    a storage medium, the storage medium storing data in a plurality of blocks, each block having a plurality of pages;
    an object interface configured to receive commands from an object device driver; and
    a controller communicatively coupled to the storage medium and the object interface and configured to receive commands via the object interface, the controller further including stored program comprising:
        logic, executed by the controller, for receiving a write request, the write request including a plurality of object identifiers comprising at least one new object identifier and at least one existing object identifier,
        logic, executed by the controller, for erasing blocks of data associated with the existing object identifier, and
        logic, executed by the controller, for writing data associated with the existing object identifier and data associated with the new object identifier.

13. The apparatus of claim 12, the logic for erasing blocks of data associated with the existing object identifier comprising logic for invalidating all pages in the blocks of data.

14. The apparatus of claim 13, the logic further comprising logic, executed by the controller, for triggering a garbage collection routine, the garbage collection routine bypassing copying of data on the erased blocks of data.

15. The apparatus of claim 12, the logic for receiving a write request comprising logic, executed by the controller, for receiving a write request generated by a log-structured merge tree database compaction operation.

16. The apparatus of claim 12, further comprising a dynamic random access memory for storing an object-to-PBA (physical block address) mapping.

17. The apparatus of claim 16, the logic further comprising logic, executed by the controller, for, prior to erasing blocks of data associated with the existing object identifier, identifying a plurality of blocks in the object-to-PBA mapping using the at least one existing object identifier.

18. The apparatus of claim 16, the logic for writing data associated with the existing object identifier and data associated with the new object identifier further comprising logic, executed by the controller, for updating the object-to-PBA mapping after writing the data.

19. The apparatus of claim 12, the logic for receiving a write request comprising logic, executed by the controller, for receiving a key range object, the key range object including a plurality of keys and a plurality of values associated with the plurality of keys.

20. The apparatus of claim 12, the logic for writing data associated with the existing object identifier and data associated with the new object identifier comprising logic, executed by the controller, for segmenting the data based on a block size of the storage medium and writing the segmented data to a plurality of blocks, the plurality of blocks only storing data written in response to the write request.

* * * * *

UNITED STATES PATENT AND TRADEMARK OFFICE
CERTIFICATE OF CORRECTION

PATENT NO. : 10,445,022 B1  
APPLICATION NO. : 15/963386  
DATED : October 15, 2019  
INVENTOR(S) : Qiu et al.

Page 1 of 1

It is certified that error appears in the above-identified patent and that said Letters Patent is hereby corrected as shown below:

On the Title Page

At (72) replace:
"Sheng Qui, Dublin, CA (US); Fei Liu, Burlingame, CA (US); Shu Li, Santa Clara, CA (US)"
With:
-- Sheng Qiu, Dublin, CA (US); Fei Liu, Burlingame, CA (US); Shu Li, Santa Clara, CA (US) --

Signed and Sealed this
Twenty-fourth Day of December, 2019

Andrei Iancu
*Director of the United States Patent and Trademark Office*